Figure 5:
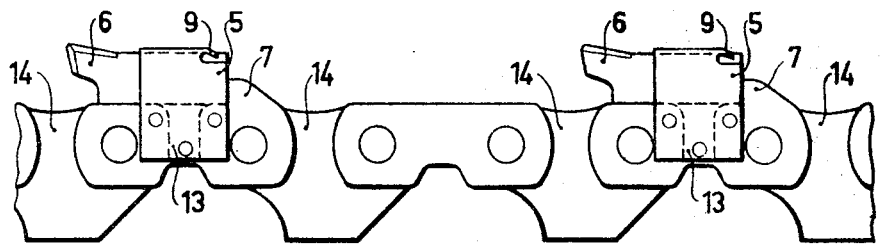

Aug. 1, 1961  G. K. G. LUNDBERG  2,994,350
SAW WITH INSERT TEETH
Filed Feb. 10, 1959  2 Sheets-Sheet 1
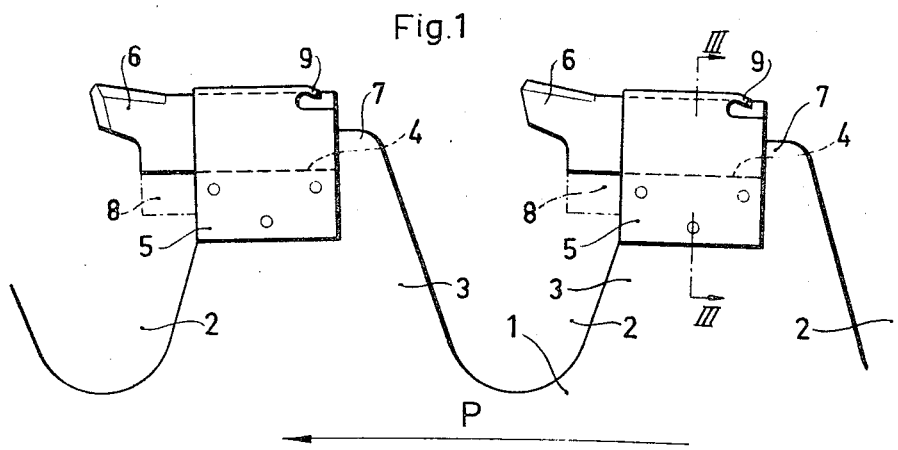
Fig. 1
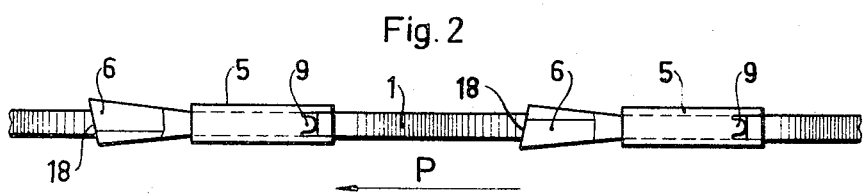
Fig. 2
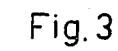
Fig. 3
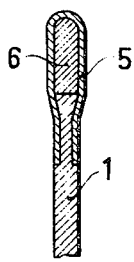
Fig. 4
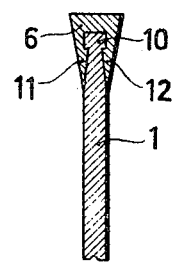
*Inventor*
GUNNAR KARL GÖSTA LUNDBERG
By *Toulmin & Toulmin*
Attorneys Aug. 1, 1961  G. K. G. LUNDBERG  2,994,350
SAW WITH INSERT TEETH Filed Feb. 10, 1959  2 Sheets-Sheet 2

Inventor
GUNNAR KARL GÖSTA LUNDBERG

By Toulmin & Toulmin
Attorneys

United States Patent Office 2,994,350
Patented Aug. 1, 1961

2,994,350
SAW WITH INSERT TEETH
Gunnar Karl Gösta Lundberg, Tallberga,
Sundsvall, Sweden
Filed Feb. 10, 1959, Ser. No. 792,317
Claims priority, application Sweden Feb. 13, 1958
7 Claims. (Cl. 143—148)

The invention has reference to saws with insert teeth. Such teeth have been used to a certain extent, especially in the U.S.A., in connection with large circular saws, because the saw disc then can be made of softer material which is not so expensive and only the teeth have to be manufactured from steel of good quality and the sharpening of the teeth does not require the same care and expedience as is necessary in connection with usual saws.

However, known saws with insert teeth are subject to the disadvantage that owing to the construction of the fastening of the teeth they have too broad cutting edges and become too thick. When cutting f.i. logs parallel to the grain this causes substantial losses in sawn material. Owing to this fact and to the raising timber prices the use of saws with insert teeth has recently decreased substantially.

Another inconvenience connected with the said saws consists in that the teeth themselves require much material and thus are expensive and that the cutting operation itself requires more work so that it is necessary to provide for very strong driving motors and transmissions. The saws further are difficult to handle at work owing to the thickness of the blade.

The object of the present invention is to avoid the said inconveniences by means of a very compact and space saving fastening arrangement for the teeth of the saw. The invention is principally characterized thereby that, in a saw, the saw teeth carrying saw body—i.e. the saw disc, the saw blade or the saw chain—of which is provided with tooth holding sockets in which the saw teeth are to be inserted in such a way that their longitudinal axes will be orientated principally in the direction of cut, the said holding sockets are formed by means of nearly rectangular casings of thin sheet-metal steel or the like which are mainly U-shaped in section and which take hold of the sawbody by means of radially directed shanks permanently secured to the same, said casings being intended mainly to take up the torque due to the cutting angle and the centrifugal force of the tooth bodies. It is further constituent for the invention that the saw body itself in order to convey the forces acting upon the teeth in longitudinal direction is provided with shoulders which transmit the said forces directly to the saw body.

The tooth bodies preferably also have an elongated form and are provided with a cutting edge point. Owing to this arrangement the tooth bodies are held securedly and without vibrations the dimensions being at the same time reduced.

The tooth bodies thus are preferably formed as elongated rods which are to be introduced into sockets arranged at the saw body.

The invention thus makes it possible more commonly in connection with saws—also thinner ones—to use insert teeth. By means of this also other advantages than those mentioned above may be obtained in using such saws. The repair of saws teeth of which have been damaged is thus facilitated. It is only necessary to replace damaged teeth by teeth taken from a stock which it is possible for anybody to keep and replenish. It is further unnecessary to send the saws to be repaired and no time is lost through interruption at the place of work. Also when the teeth are to be ground it is easier to send away the set of teeth for grinding than to send away the whole saw.

According to an embodiment of the invention the saw tooth bodies or the tooth roots are provided with shoulders or heads, forming stops for the teeth introduced into the casings. The said stops thus convey the compressive forces from each saw tooth to the saw body.

In order securedly to keep the tooth in the casing the same is preferably provided with a snap spring, engaging a recess in the tooth body. This snap spring may either be arranged at any of the shanks of the casing or at its top.

Thanks to the invention the width of the tooth edge can be essentially reduced and at the same time also the thickness of the saw body can be brought down to a minimum. This result is partly due to the elongated form of the casing and the tooth and partly to the fact, that the compressive forces act mainly in the longitudinal direction of the tooth bodies. It is of course evident that also with the arrangement according to the invention there will be a limit for the reduction of the thickness of the saw body at which there will be a risk of vibrations. Another possibility of reducing the risk of vibrations and at the same time of further bringing down the thickness of the saw body consists according to a further development of the invention therein that the saw tooth points are formed in a special way. The invention thus is also characterized in that the point of every other tooth of the saw body has a back grinding angle which lies nearer to one side of the tooth cutting edge and every other tooth has a back grinding angle which lies nearer to the other side of the tooth cutting edge.

This arrangement is obtained by the fact that the points of the saw teeth when grinding the back grinding angle are formed with a narrower bevelling (major grinding angle) at the side of the tooth which is turned outwardly towards the side of the kerf (if seen from the other tooth). The kerf will thus be divided up into two parts, one corresponding to all teeth with even numbers and one corresponding to all teeth with uneven numbers.

Owing to the fact that the teeth tops only have to cut half the kerf the strain to which the teeth and the sockets are exposed is reduced.

The teeth further will be loaded in a more even way.

In order further to increase the cutting ability of the teeth they are formed with a frontal grinding angle which is providing such an inclination in relation to the flanks of the teeth that the obtuse angle then formed is obtained at the side of the tooth bounding the narrow bevelling. Owing to this fact the said corner will thus be the last in the cutting direction and the tooth will thus obtain a good and even cutting ability.

The frontal angle of the tooth ought to be as acute as the used material permits.

Figure 6:
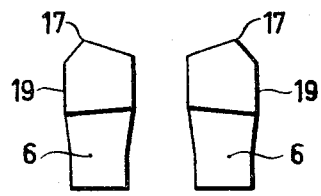
Figure 7:
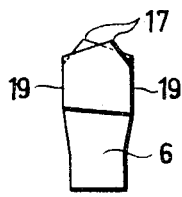

The invention will now be described more in detail, reference being had to the accompanying drawings in which the different figures show:

FIG. 1 an embodiment of the invention applied to a circular saw seen from the side;

FIG. 2 the same embodiment seen from above;

FIG. 3 the same embodiment in a frontal view section according to the line III—III in FIG. 1;

FIG. 4 an alternative arrangement in which the tooth has a socket in the form of a casing in a frontal sectional view;

FIG. 5 the invention as applied to a chain saw;

FIG. 6 two kinds of sawing teeth according to the invention in a cross section;

FIG. 7 the two kinds of sawing teeth placed one behind the other.

According to the figures the saw body consists of a circular saw disc 1, which is provided with chip or shaving gullets 2 as well as with a tooth root 3 arranged between two and two of the said gullets. Over the upper edge of the tooth root 4 a casing or socket 5 is arranged the two shanks of which take hold of the tooth root and are at each side somewhat recessed in ground out concavities in the side walls of the tooth root. The shanks are fixed to the tooth root by means of spot welding for instance. Over the upper edge 4 of the tooth root inside the casing there is formed a space of rectangular cross-section in which the saw tooth is inserted. The same can be made of steel of high quality, high speed steel or hard metal. It has an elongated parallelepipedic body the rear edge of which is resting against a head or a shoulder 7. Alternatively the tooth body may instead be provided with a shoulder 8, as indicated by means of dashed lines in FIG. 1.

As indicated in FIG. 2 the teeth are of two kinds, which for the sake of simplicity may be designated as teeth with even and uneven numbers. The latter have a frontal grinding angle which forms an obtuse angle with the right-hand side of the kerf and the former with the left-hand side of the same, the kerf being looked at in the direction of the arrow P (FIGS. 1 and 2). The teeth are also so broad that the edge will be somewhat broader than the width of the casing and consequently also broader than the thickness of the saw blade in order to prevent the blade from being tightly squeezed in the kerf. The form of the teeth will be described more in detail in the following in connection with FIGS. 6 and 7.

The tooth body is introduced in the casing or socket so as to fit snugly therewithin, in order to avoid vibrations. At the rear edge of the casing the same is provided with a snap spring 9 which snaps into a recess in the tooth body, so that the same is securely fixed in its position. During the sawing the teeth are moved in the direction indicated by the arrow P. The compressive forces during the sawing will thus act in the longitudinal direction of the tooth bodies, which from the constructional point of view is the most advantageous direction of load.

In FIG. 4 there is shown another embodiment of the invention. In this execution the tooth is provided with a setting in the form of a casing. The saw body being provided with a bulge or verge 10 which in the figure is shown in section. At the same there is arranged the setting of the tooth 6 which setting is provided with the shanks 11 and 12. The tooth may be executed in one piece together with the setting or can be jointed to the same by means of soldering in a suitable manner. The setting thus may be made of steel, while the tooth body itself is made of hard metal.

In FIG. 5 there is shown an execution of the invention in connection with chain saws. In this case the casing 5 is fixed to a chain link 13 in a saw chain 14 which is guided over rollers.

In FIG. 6 the two kinds of saw teeth according to the invention are shown, the teeth being arranged side by side so as to make it possible to compare them. As it appears both types of teeth are provided with a back grinding angle 17. In respect of the left-hand tooth, i.e., the tooth, which when in operation is supposed to follow the left-hand side of the kerf, the said back grinding angle is lying near to this side of the kerf while the right-hand tooth is lying near to the right-hand side of the kerf. Consequently—if both teeth when operating will take the positions one behind the other as shown in FIG. 7— the kerf will be divided into two parts—one corresponding to the left-hand tooth and all remaining saw teeth with uneven numbers, and one corresponding to the right-hand tooth and all remaining saw teeth with even numbers.

However, this dividing up will only be of importance for the forward cutting direction of the teeth, i.e. the cutting by means of the tops of the teeth. As soon as the tops of the teeth have cut so deeply into the material that the side edges 19 get operative each tooth will by means of its side edges cut into both parts of the kerf. The tops of the teeth will thus be effective in half the kerf only, while the rest of the tooth will work in the whole kerf.

By means of this dividing up it is won, as this has already been pointed out, partly that the strain which the teeth are exposed to will be substantially smaller than it would be otherwise, partly that the forces acting upon the teeth will be balanced. On the whole it is of importance, that the boundary surfaces of the tooth points have such angles in relation to the longitudinal axis of the tooth body, that during the sawing the tooth pressure is substantially taken up by the shoulder and that the strain to which the casing is exposed will be small. It is thus necessary to choose appropriate angles for the said surfaces in relation to the normal of the saw body taking into consideration the desired sawing result, the possible strains affecting the casing as well as the angles which are possible to obtain with regard to the material of the tooth.

Experiments which have been made speak in favour of a choice of the different characteristic angles of the tooth point within the following limits:

| | Degrees |
|---|---|
| In respect of the frontal grinding angle of the tooth | 6–24 |
| In respect of the cutting angle of the tooth | 5–40 |
| In respect of the major back grinding angle (narrower bevelling) of the tooth | 5–95 |
| In respect of the minor back grinding angle (broad bevelling) of the tooth | 4–30 |

Good results have for instance been obtained with a tooth point having the following values of the angles:

| | Degrees |
|---|---|
| In respect of the frontal grinding angle of the tooth | 12 |
| In respect of the cutting angle of the tooth | 25.7 |
| In respect of the major back grinding angle of the tooth | 50 |
| In respect of the minor back grinding angle of the tooth | 18 |

Considering the above mentioned points of view as well as the results of the said experiments it has been found in connection with a further investigation, that it also can be suitable to carry out the teeth in such a way that the projection of their narrower bevelling upon the normal of the saw body will make about 5% to 40% of the width of the tooth.

In following the said general lines it is possible to achieve that the compressive saw forces will act mainly in the longitudinal direction of the tooth bodies.

It has further been found that the sawing result attained may be further improved if the saw tooth points are executed with a frontal grinding angle 18 which is providing such an inclination in respect of the flanks of the teeth that the obtuse angle then formed is obtained at the side of the tooth bounding the narrow bevelling, the said corner being thus the last in the cutting direction at the movement of the tooth.

A further characteristic of the invention consists therein, that the bevellings are made concave, convex or are brought to form a parallelepipedic or prismatic surface. Through this the teeth leave at the beginning of the cutting very thin ribs in the sawn material, which ribs are smoothed off by the following teeth having cut deeper into the material. This smoothening brings about a plain and smooth sawing surface through removing of the thin chips or shavings.

Another characteristic of the invention which further increases the smoothness of the sawn surface consists therein that the teeth are provided with a side cutting edge which is formed along the intersection edge between the shaving angle plane of the tooth and the side plane, the side clearance thus beginning somewhat below the said cutting edge of the tooth. The teeth are further suitably provided with side clearances forming angles partly in relation to the cutting direction and partly to the plane of the saw body, the said angles being chosen with due attention to the width and thickness of the tooth fastening socket.

When carrying out the invention specially good sawing results have been obtained by using teeth made of high speed steel and teeth of hard metal.

Although the invention has been described in connection with certain modes of execution the same may arbitrarily be modified within the scope of the appended claims.

What I claim is:

1. An insertible tooth circular saw comprising a circular tooth carrying body, a plurality of projections extending radially from said body and each having a shoulder, a corresponding number of tooth holding sockets having radially directed shanks forming substantially U-shaped rectangular casings of thin sheet metal steel, each socket being inversely mounted on one of said projections and permanently secured thereto by means of said shanks, a plurality of elongated tooth bodies inserted in said substantially rectangular casings, respectively, with their longitudinal axes oriented principally in the cutting direction and engaging its associated shoulder, said shoulders adapted to convey the forces acting upon the teeth in the cutting direction to said projection, the casing mainly taking up the torque due to the cutting angle and the centrifugal force of the tooth bodies.

2. A saw as claimed in claim 1, in which the tooth bodies are formed substantially as elongated, rectangular rods, which are to be introduced into the space formed between the edge and the inner surface of each casing so as to fit snugly therein.

3. A saw as claimed in claim 1, said tooth bodies having recesses, snap springs on said U-shaped rectangular sockets at their rear edge, said springs being arranged so as to engage said corresponding recesses in said tooth bodies, so as to hold said bodies after insertion into said casings.

4. An insertible tooth circular saw comprising a circular tooth carrying body, a plurality of projections extending radially from said body, a corresponding number of tooth holding sockets having radially directed shanks forming substantially U-shaped rectangular casings of thin sheet metal steel, each socket being inversely mounted on one of said projections and permanently secured thereto by means of said shanks, a plurality of elongated tooth bodies each one inserted in one of said substantially rectangular casings, said tooth bodies having their longitudinal axes oriented principally in the cutting direction, and shoulders on said tooth bodies engaging the leading edge of said projections when said tooth bodies are in the casings.

5. An insertible tooth circular saw comprising a circular, tooth carrying body, a plurality of projections extending radially from said body, a corresponding number of tooth holding sockets having radially directed shanks forming substantially U-shaped rectangular casings of thin sheet metal steel, said casings being inversely mounted on said projections, respectively, and permanently secured thereto by means of said shanks, a plurality of elongated tooth bodies inserted in said substantially rectangular casings, respectively, with their longitudinal axes oriented principally in the cutting direction, said tooth bodies having points on successive teeth alternately located closer to opposite sides of the blade by reason of the allochiral back grinding angles and shoulders arranged on said projections engaging said tooth bodies, respectively, to convey the forces acting upon the teeth in the cutting direction, the casing mainly taking up the torque due to the cutting angle and the centrifugal force of the tooth bodies.

6. An insertible tooth circular saw comprising a circular tooth carrying body, a plurality of projections extending radially from said body, a corresponding number of tooth holding sockets having radially directed shanks forming substantially U-shaped rectangular casings of thin sheet metal steel, said casings being inversely mounted on said projections, respectively, and permanently secured thereto by means of said shanks, a plurality of elongated tooth bodies inserted in said substantially rectangular casings, respectively, with their longitudinal axes oriented principally in the cutting direction, said tooth bodies having points which alternately have a frontal grinding angle forming an obtuse angle with the right-hand side of the kerf, and a frontal grinding angle forming an obtuse angle with the left-hand side of the kerf, and shoulders arranged on said projections engaging said tooth bodies, respectively, to convey the forces acting upon the teeth in the cutting direction, the casing mainly taking up the torque due to the cutting angle and the centrifugal force of the tooth bodies.

7. A saw as claimed in claim 1, wherein said tooth bodies have a frontal grinding angle of 6° to 24°, a cutting edge angle of between 5° and 40°, a major back grinding angle of between 5° and 95°, and a minor back grinding angle of between 4° and 30°.

References Cited in the file of this patent

UNITED STATES PATENTS

| | | |
|---|---|---|
| 561,115 | Krieger | June 2, 1896 |
| 579,383 | Coyle | Mar. 23, 1897 |
| 1,649,864 | Sherman | Nov. 22, 1927 |
| 1,797,611 | Jones | Mar. 24, 1931 |
| 2,703,593 | Weller | Mar. 8, 1955 |
| 2,736,352 | Wright | Feb. 28, 1956 |
| 2,746,494 | Cox | May 22, 1956 |
| 2,852,048 | Cox | Sept. 16, 1958 |